(12) United States Patent
Schumacher et al.

(10) Patent No.: US 6,442,919 B1
(45) Date of Patent: Sep. 3, 2002

(54) GRAIN LIFTER

(75) Inventors: Gustav Schumacher, Gartenstrasse 8, D-57612 Eichelhardt (DE); Friedrich-Wilhelm Schumacher, Eichelhardt (DE); Srecko Klepej, Petrovce (SI)

(73) Assignee: Gustav Schumacher (DE)

( * ) Notice: Subject to any disclaimer, the term of this patent is extended or adjusted under 35 U.S.C. 154(b) by 0 days.

(21) Appl. No.: 09/623,929
(22) PCT Filed: Mar. 5, 1999
(86) PCT No.: PCT/EP99/01430
§ 371 (c)(1), (2), (4) Date: Jan. 9, 2001
(87) PCT Pub. No.: WO99/45758
PCT Pub. Date: Sep. 16, 1999

(30) Foreign Application Priority Data

Mar. 10, 1998 (SI) .................................. 9800071
Jan. 23, 1999 (DE) ......................................... 199 02 459

(51) Int. Cl.⁷ ......................... A01D 34/14; A01D 34/18; A01D 34/20
(52) U.S. Cl. ............................ 56/307; 56/305; 56/298
(58) Field of Search ........................ 56/307, 313, 298, 56/312, 314, 303, 318, 305, 319, 320

(56) References Cited

U.S. PATENT DOCUMENTS

| 1,818,335 | A | * | 8/1931 | Kenison | 56/312 |
| 1,862,775 | A | * | 6/1932 | Thoen | 56/313 |
| 2,892,298 | A | * | 6/1959 | Chaney | 56/314 |
| 3,313,095 | A | * | 4/1967 | Gaterman | 56/312 |
| 3,455,093 | A | * | 7/1969 | Stern | 56/305 |
| 3,579,967 | A | * | 5/1971 | Schumacher | 56/313 |
| 3,834,139 | A | * | 9/1974 | Schumacher II et al. | 56/313 |
| 4,120,138 | A | * | 10/1978 | Schumacher II et al. | 56/313 |
| 4,295,328 | A | * | 10/1981 | Schumacher II et al. | 56/313 |
| RE33,546 | E | * | 3/1991 | O'Halloran | 56/305 |
| 5,343,682 | A | * | 9/1994 | Puncochar | 56/305 |

FOREIGN PATENT DOCUMENTS

| DE | 4323053 | * | 1/1995 | .......... A01D/65/02 |
| GB | 2028088 | * | 3/1980 | |

* cited by examiner

Primary Examiner—Robert E. Pezzuto
Assistant Examiner—Árpád F Kovács
(74) Attorney, Agent, or Firm—Harness, Dickey & Pierce, P.L.C.

(57) ABSTRACT

A grain lifter for a combine harvester mowing system with mowing fingers (2) has a carrier rail (6) that receives a fixing element (10). The fixing element (10) is connected to the carrier rail (6) which, in turn, secures the grain lifter to the mowing finger (2). The fixing element (10) includes a holding element (11) with two spaced arms (12, 12a). The tip of the mowing finger (2) can be introduced between the two arms. A locking lever (17) is supported on a pivot pin (16), between the two arms (12, 12a) of the holding element (11). The locking lever (17) has a first lever arm (18) with a supporting face (19). The supporting face (19) contacts the upper face (20) of the mowing finger (2). A second lever arm (21) of the locking lever (17) includes three engaging faces (22, 22a, 22b). A locking element, in the form of a leaf spring (25), is provided. The leaf spring (25) has an end face (26) which, depending on the pivot position of the locking lever (17), establishes contact with one of the engaging faces (22, 22a, 22b). Accordingly, this secures the locking lever (17), so that the carrier rail (6) can be positioned at different distances from the mowing finger (2).

19 Claims, 4 Drawing Sheets

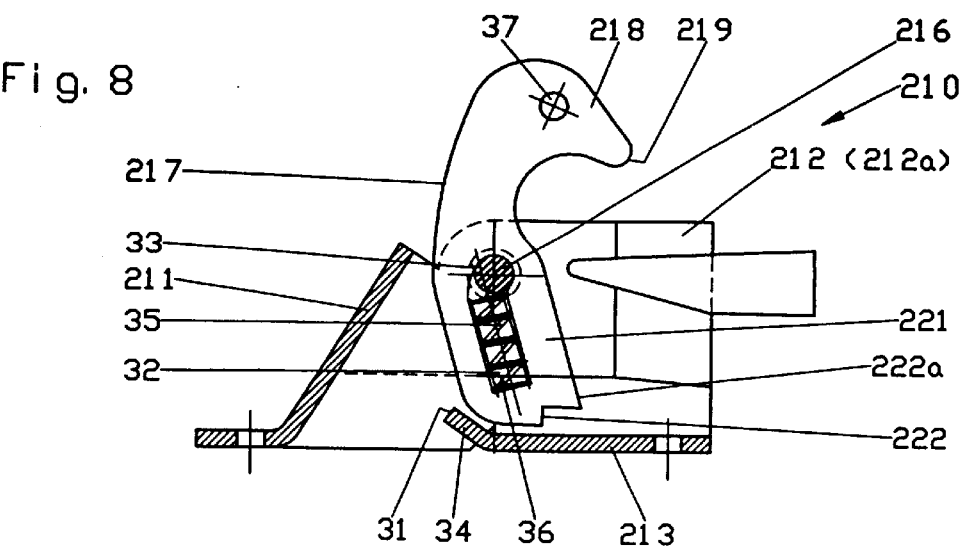
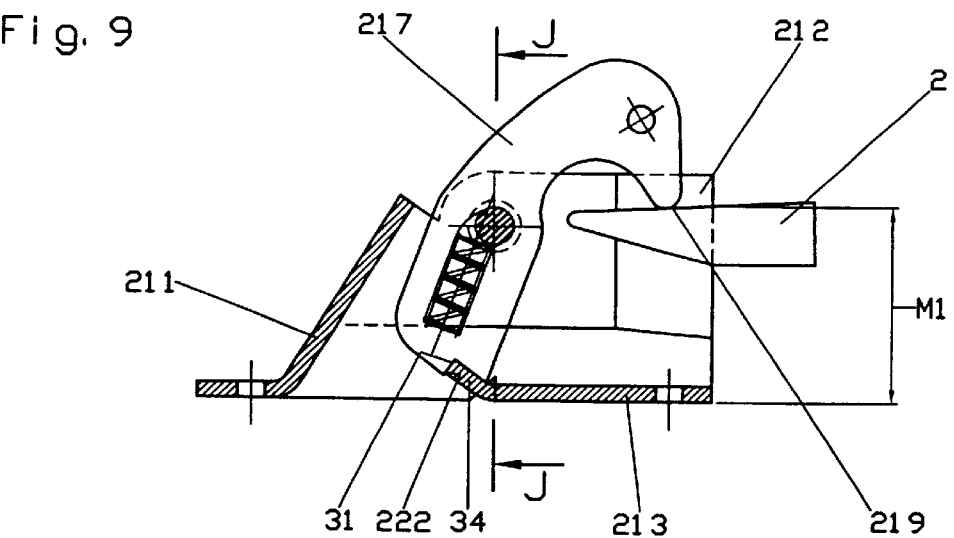
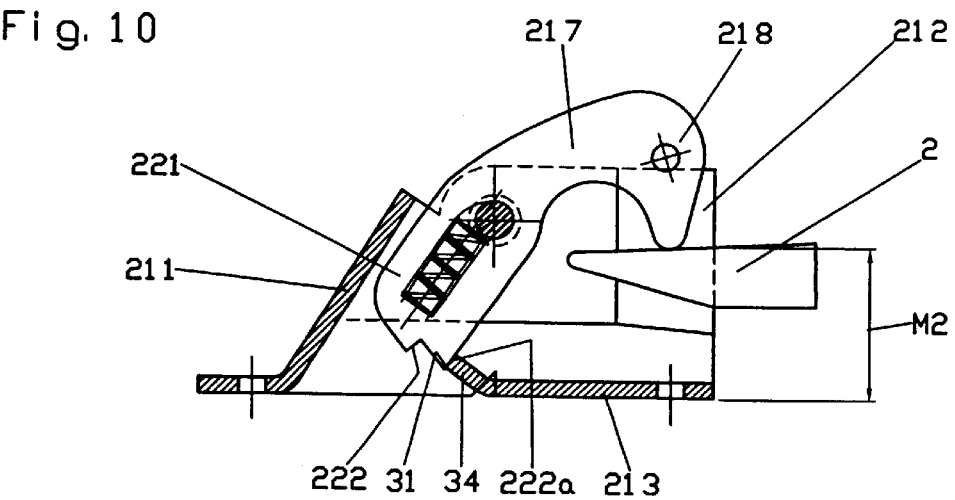

GRAIN LIFTER

BACKGROUND OF THE INVENTION

The invention relates to a grain lifter for combine harvester mowing systems. The grain lifter has mowing fingers attached to a finger bar. The mowing fingers comprise a carrier rail connectable to the finger bar; a stem lifter connected to the carrier rail; and a fixing element connected to the carrier rail and securable to the finger bar. A holding element is attached to the carrier rail. The holding element includes two spaced arms which receive the tip of the mowing finger. Also, a holding means contacts an upper face of the mowing finger for supporting purposes.

In mowing systems, mowing fingers are arranged so as to be distributed along the finger bar. The fingers are bolted to the finger bar. The mowing fingers guide the cutter bar. The mowing fingers serve as a counter blade for the blades of the mowing knifes attached to the cutter bar. The blades, move to and fro.

Grain lifters are used to safely mow bent or lying crops. The grain lifters lift the stem material. Depending on the type and condition of the stem material and on the required cutting height, different settings are required for the mowing system. As a result, the alignment of the grain lifter relative to the ground also changes. However, the goal is to achieve an alignment which enables the sliding range of the grain lifter to be guided as parallel as possible relative to the ground. In practice, this is achieved by using grain lifters which enable a change in the orientation of their region projecting beyond the mowing finger tip. For this purpose, this region is raised or lowered to a greater or lesser extent relative to the mowing finger.

In this context, GB-A-2028088 illustrates the carrier rail of the grain lifter with a holding element. The holding element has two parallel arms between which the tip of the mowing finger can be inserted. The two arms each include pairs of bores arranged at different levels. A locking bar or locking pin supported on the upper face of the mowing finger can be guided through the bores associated with a pair of bores. Depending on the required orientation, one of the pairs of bores can be selected. This type of connection requires a certain amount of handling skill. It is disadvantageous because the locking bars can be lost in operation. Also, the bars can be lost after they have been released. To prevent loss, various means have been provided in the art to safely secure the locking bar at the holding element.

SUMMARY OF THE INVENTION

It is the object of the invention to provide a simplified grain lifter. In accordance with the invention, the holding means includes a two-arm locking lever. A first lever arm has a supporting face supported on the upper face of the mowing finger. The second lever arm has at least one engaging face. The two-arm locking lever is supported so as to be pivotable around a pivot pin between the two arms. A fixing element has a locking element which can contact one of the engaging faces of the second lever arm. Thus, the fixing element holds the locking lever in its position.

An advantage of this design is that, when aligning the grain lifter, starting from the released position, the mowing finger tip hits one of the lever arms and thus causes the locking lever to pivot towards the locked position. In order to transfer the locking lever into the required position, one hand is used to raise the grain lifter region projecting beyond the mowing finger tip. The other hand is used to apply pressure to the second arm of the locking lever, to bring the locking lever into contact with the locking element. Accordingly, no components can be lost. Furthermore, it is not necessary to find the right position to guide the locking bar through the bores of the pair of bores, as is needed in the prior art.

It is possible to provide any number of engaging faces, but three engaging faces are sufficient. These are preferably provided in the form of parts of engaging teeth. In one advantageous embodiment, the locking element is formed by a leaf spring. The spring resiliently establishes contact in the direction towards the engaging faces of the locking lever. The respective engaging positions are then assumed automatically without the need for a manual locking operation. For engaging purposes, the leaf spring has an end face which establishes contact with one of the engaging faces. For example, this can be the free end of the leaf spring which is otherwise locally fixed. Also, it is possible to select an orientation which ensures that if pressure is applied, there is no risk that the leaf spring will escape. However, according to a further embodiment, the leaf spring has an aperture. One of the faces of the aperture is designed as a contact face. The locking lever, via its engaging face, establishes contact with the contact face. Also, it is possible to provide an arrangement whereby the leaf spring, in the engaged condition, is subjected to tension.

A particularly advantageous embodiment is achieved if the first and the second lever arm adjoin one another at an angle and if the pivot axis of the pivot pin is arranged in the region of the abutment. For this purpose, the locking lever is preferably provided with a bore. The locking lever is received on the pivot pin in the bore. The position of the fixing element can be chosen such that, during mounting, the second lever arm is displaced by the mowing finger into its first engaging position. Accordingly, one of the engaging faces enters into an operating connection with the locking element. To release the locking element, the locking lever has to be moved out of the operating connection with the locking element. In the embodiment where the locking element is in the form of a leaf spring, it is possible to use a screwdriver.

While it is possible for the arms of the fixing element to be integral with the carrier rail, it is preferred to connect the arms to one another by a web and to secure the web to the carrier rail. This results in a U-shaped form of the holding element. Alternatively, the arms can be connected to one another by two separate webs. The webs are secured to the carrier rail. The height of the arms is such that the first lever arm projects upwardly beyond the arms to be able to act from the outside on the first lever arm. According to a further embodiment, the leaf spring is arranged so as to be protected between the arms in the range of movement of the second lever arm.

For an alternative type of engagement, the locking lever in the region of its second lever arm is provided with an oblong hole which is passed by a pivot pin. The locking element is in the form of a stop fixed in position. For releasing purposes, the locking lever can be pulled out of contact with the stop. The return into the engaged position can be effected by hand. However, it is also possible to load the locking lever by a spring force into a position where the stop is positioned within the range of movement of the second lever arm. As far as the design of the holding element is concerned, the two arms of the holding element are connected to one another by a web. This achieves a substantially U-shape embodiment. The stop is preferably connected to the web or it forms part of the web. Here, the locking lever is arranged between the two arms. The stop can be formed by a bent part of the web.

To provide the spring force, a pressure spring is received in the oblong hole of the second lever arm of the locking lever. The spring is supported between an end face of the oblong hole and the pivot pin. To facilitate the release of the locking lever from the engaged position, its first lever arm has an aperture. A piece of wire or tool is guided through the hole to facilitate the displacement of the locking lever into the released position. A pressure spring is not required to achieve the locking effect. However, the spring force facilitates the re-setting of the locking lever into a position where its second lever arm, by means of its engaging faces, can be moved into contact with the stop. The locking lever itself is held in the locked position via the resilient pre-tension of the carrier rail. The carrier rail, at one end, is secured to the finger bar. The end of the carrier bar is yoke-shaped and, via a recess, is insertable into a groove of a pin. An oblong hole is provided in the locking lever to provide a region of engagement to receive the pivot pin to additionally secure the locking lever against displacement.

From the following detailed description, taken in conjunction with the drawings and subjoined claims, other objects and advantages of the present invention will become apparent to those skilled in the art.

BRIEF DESCRIPTION OF THE DRAWINGS

Different embodiments of the invention are diagrammatically illustrated in the drawings wherein:

FIG. 8 is a longitudinal section view through a further embodiment of a fixing element in the released position.

FIG. 9 is a view according to FIG. 8 with the locking lever in a first engaged position.

FIG. 10 is a longitudinal section view according to FIG. 8, with the locking lever in a second engaged position.

DETAILED DESCRIPTION OF THE PREFERRED EMBODIMENT

Figure 1:
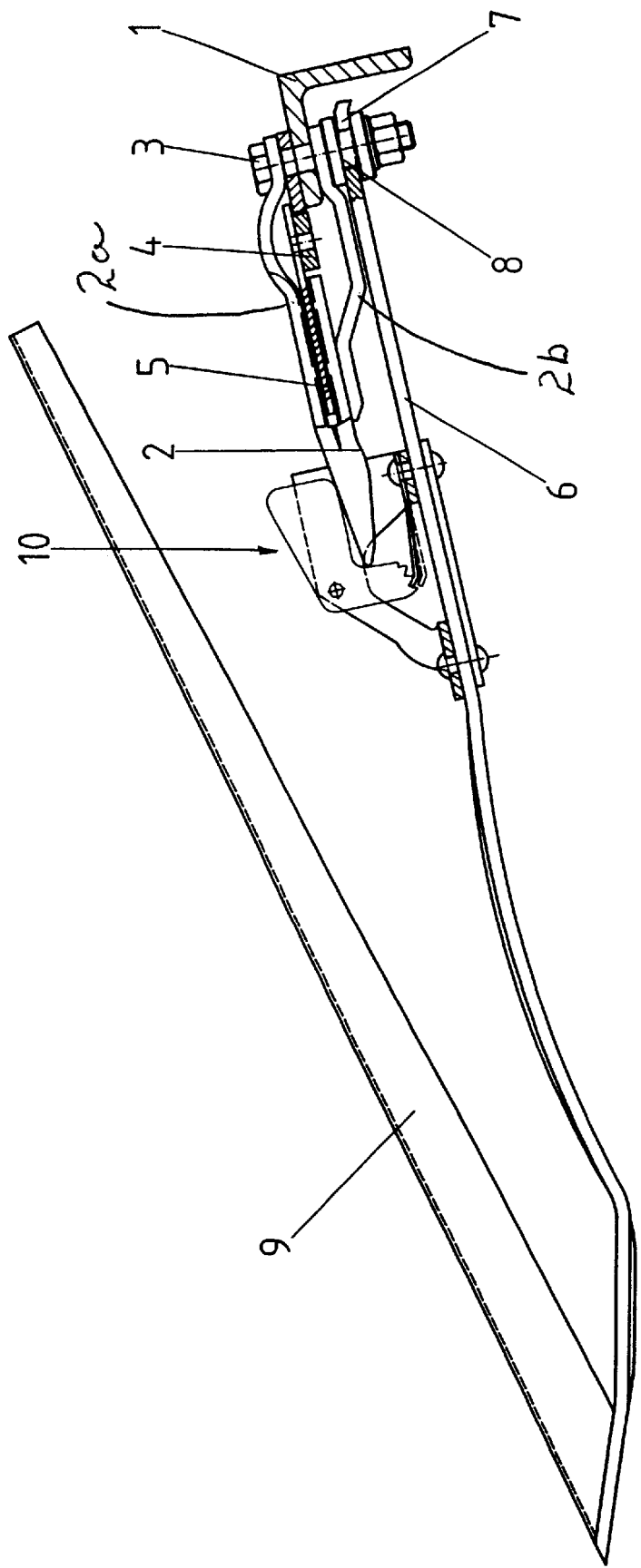
FIG. 1 is an elevation view partially in section of a grain lifter associated with a finger bar.

FIG. 1 shows a cross-section view through a finger bar 1. The finger bar 1 is associated with a mowing finger 2. The mowing finger 2 is secured to the finger bar by a bolt 3. The cutter bar 4 carries the knives 5. The knives can be moved to and fro in a gap of the mowing finger 2. The cutter bar 4 is moved in and out of the drawing plane. The mowing finger 2 has an upper finger 2a and a lower finger 2b between which the knives 5 are held. The mowing finger 2 serves as a counter cutting edge for the cutting edges of the knives 5.

The grain lifter comprises a carrier rail 6. The carrier rail 6, at one end 7, has a recess. The recess starts from the respective end face. The recess enables the carrier rail 6 to be inserted into a groove 8 of an annular element positioned on the bolt 3. The carrier rail 6 is designed to be elastically resilient.

An angularly projecting stem lifter 9 is connected to the free end of the carrier rail 6. The stem lifter free end projects forwards beyond the mowing finger 2. A fixing element 10 is attached to the carrier rail 6. In the region between the fixing end 7, the end is connected to the stem lifter 9. The fixing element 10 serves to align the grain lifter relative to the ground with respect to its portion projecting beyond the mowing finger 2. The carrier rail 6 is tensioned. The fixing element 10 serves to position the carrier rail 6 relative to the mowing finger 2 in different positions.

FIGS. 2 to 10 show differently designed fixing elements for aligning the grain lifter relative to the mowing finger. The first embodiment can be seen in FIG. 2 to 4 and 7 which will be described below.

The fixing element 10, in its first embodiment, has a holding element 11. The holding element 11 has a U-shaped cross-section with two arms 12, 12a arranged parallel relative to one another. The arms 12, 12a are distanced from one another and are connected to one another by a web 13 (see FIG. 4) and webs 13a, 13b respectively (see FIG. 4). Towards the web 13, the two arms 12, 12a include an aperture 14. The web 13 and the webs 13a, 13b respectively rest on the carrier rail 6. The webs 13, 13a, 13b are bolted or riveted to the carrier rail 6 to fix the holding element 11 in position.

A pivot pin 16 passes through two arms 12, 12a towards the upper faces of the two arms 12, 12a. The pivot pin 16 supports a locking lever 17. A bore in the locking lever 17 positions the locking lever 17 on the pivot pin 16. The locking lever 17 has the shape of an angle lever. The lever 17 has a first lever arm 18 and a second lever arm 21. The pivot pin 16 supports the locking lever 17 approximately in the region in which the two lever arms 18, 21 extend from one another.

The inner face of the first lever arm 18 forms a supporting face 19. The supporting face 19, in parts, can extend with a radius. The outer face 28 of the first lever arm 18 is acted upon by hand to pivot the locking lever 17. The second lever arm 21 has teeth 23 at its free end remote from the pivot pin 16. Each tooth forms an engaging face 22, 22a, 22b. A sliding face 24 is at the front of the first tooth 23 with the first engaging face 22.

Figure 2:
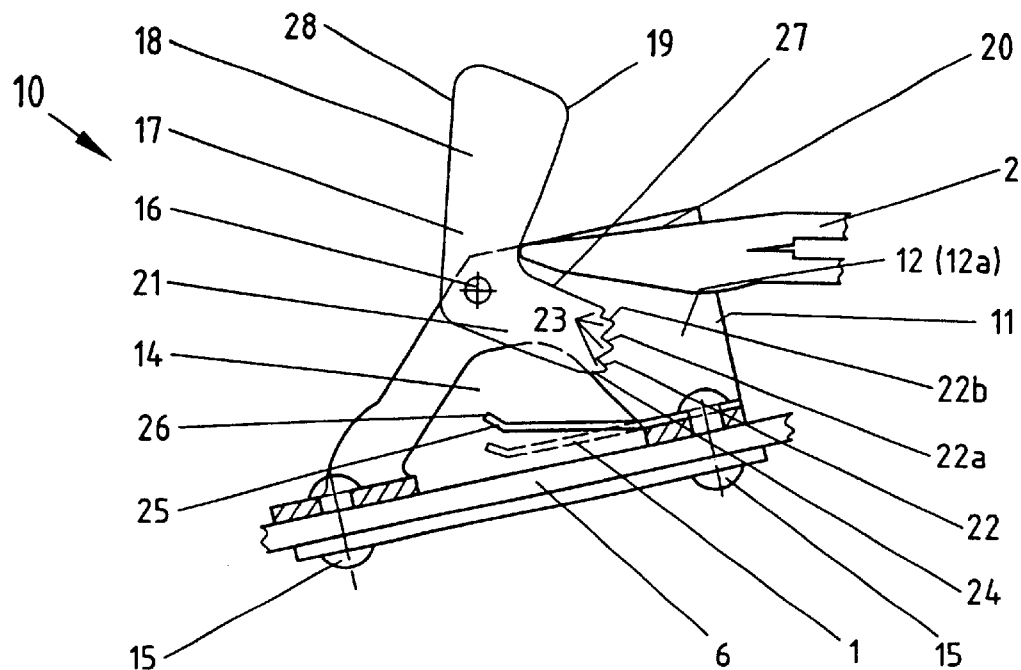
FIG. 2 is a longitudinal section view through a first embodiment of a fixing element in the released position.

The end of the second lever arm 21, with teeth 23 and engaging faces 22, 22a, 22b, is positioned in a range of movement to contact the end face 26 of a cranked end of a leaf spring 25. The leaf spring serves as a locking element. The other end of the leaf spring, remote from the end face 26, is firmly connected to the holding element 11 and the carrier rail 6 by rivets 15 or bolts. In FIG. 2, the locking lever 17 is disengaged from the spring 25. Looking down on the locking lever, it is possible to see the tip or end of the mowing finger 2 whose upper face has the reference number 20.

Figure 3:
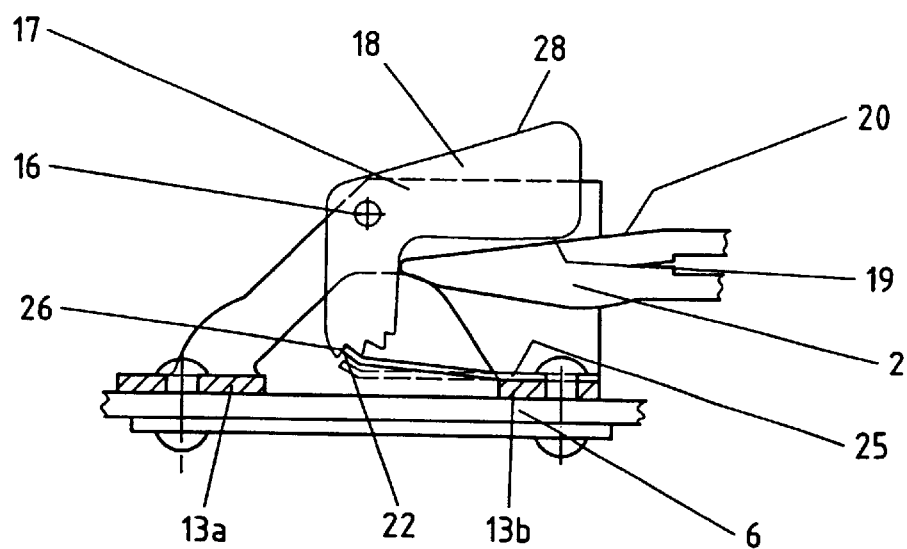
FIG. 3 is a sectional view corresponding to FIG. 2, showing the locking lever in its first locking position.

To engage the locking lever 17, as the locking lever 17 approaches the mowing finger 2, the mowing finger moves into the region of the inner face 27 of the second lever arm 21 of the locking lever 17. As this occurs, the locking lever 17 pivots clockwise around the pivot pin 16. As hand force is applied on the outer face 28 of the first lever arm 18 of the locking lever 17, the locking lever 17 is pivoted such that the engaging face 22 of the first tooth 23 comes to rest against the end face 26 of the leaf spring 25. The end face 26 is initially displaced downwardly by the sliding face 24, and then catches in the first tooth as illustrated in FIG. 3.

In the process, the locking lever 17, via its engaging face 22, supports itself against counter-clockwise movement on the end face 26 of the leaf spring 25. As the end face 26 is held in a fixed position, the locking lever 17 is engaged. The supporting face 19 is supported on the upper face 20 of the mowing finger 2. This holds the carrier rail 6 in the region in its first spaced position relative to the mowing finger 2 as illustrated in FIG. 3.

Figure 4:
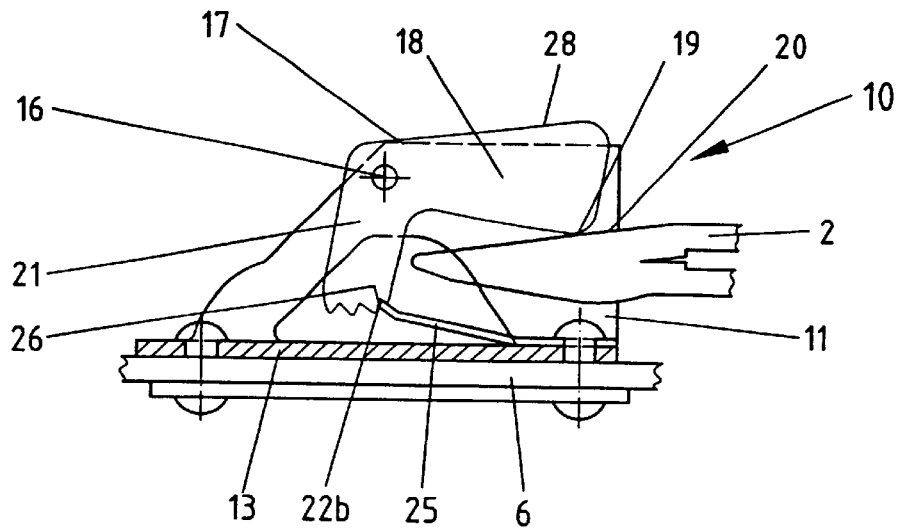
FIG. 4 is a sectional view corresponding to FIG. 2, showing the locking lever in the third engaged position.

If the locking lever 17 continues to rotate in a clockwise direction, by applying pressure to the outer face 28, simultaneously the free end of the carrier rail 6 will continue to be lifted. The locking lever 17 can pivot until it assumes a position as shown in FIG. 4. Here, the end face 26 of the leaf spring 25 is in contact with the engaging face 22b. It can be seen that in this position, the distance between the web 13 and the mowing finger 2 is smaller than in the position as illustrated in FIG. 3.

As the locking lever is pivoted, the free end of the grain lifter is moved into a further upwardly directed position. During the disengaging process, a tool, such as a screwdriver, may be inserted through the aperture 14. The screwdriver is in the region between the two arms 12, 12a and is able to act on the leaf spring 25. To facilitate the release of the spring, the locking lever or its outer face 28 can continue to be acted upon to ensure further clockwise pivoting until the leaf spring 25 is released. The spring assumes a position as illustrated by dashed lines for example in FIGS. 2 and 3. The locking lever can then pivot back into the position shown in FIG. 2.

Figures 6, 7:
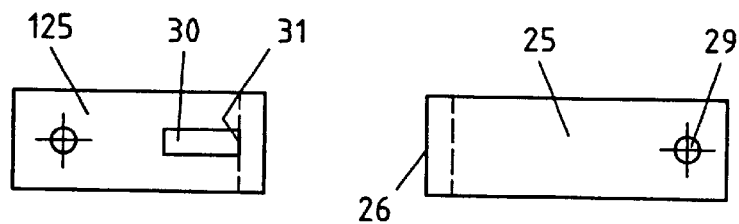
FIG. 6 is a plan view of a leaf spring with an aperture corresponding to FIG. 5.
FIG. 7 is a plan view of a leaf spring acting as the locking element corresponding to the embodiment as illustrated in FIGS. 2 to 4.

The leaf spring 25 as shown in FIG. 7 includes a bore 29. The rivet 15 passes through the bore 29 to fix the leaf spring 25 together with the holding element to the carrier rail 6.

Figure 5:
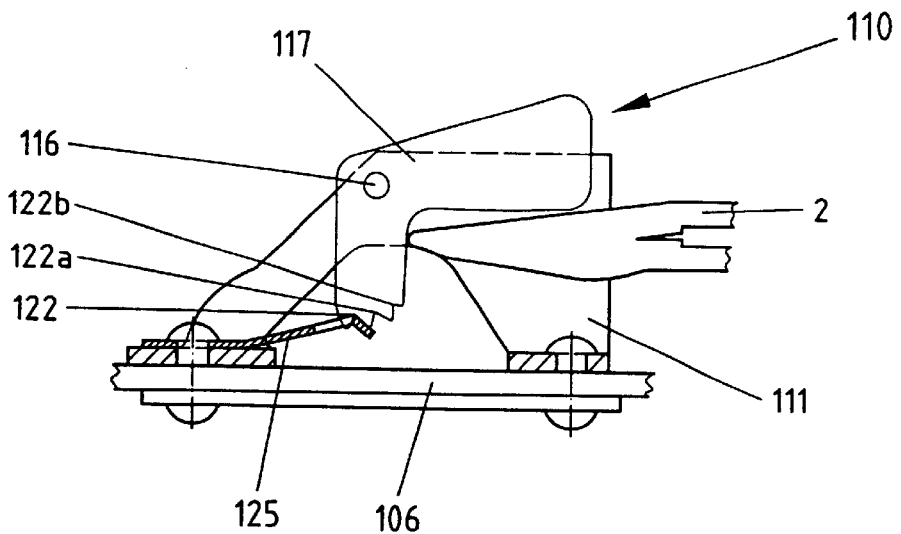
FIG. 5 is a longitudinal section view through a modified embodiment of the fixing element.

Below there will follow a description of the embodiment according to FIGS. 5 and 6. Any parts corresponding to those comprised by the embodiment according to FIG. 1 to 4, are given reference numbers which are increased by the FIG. 100 as compared to the corresponding reference numbers in FIGS. 2 to 4.

The locking lever 117, the holding element 111, the arrangement of the pivot pin 116, the association of the carrier rail 106 in the design of the fixing element 110 corresponds to the embodiment according to FIGS. 2 to 4. The fixing element 110 deviates from the above embodiment in that a leaf spring 125, constituting a locking element, is designed as shown in FIG. 6. The way in which the leaf spring 125 is associated with the holding element 111 also differs. The leaf spring 125 is secured in the holding element 111 at its end facing away from the mowing finger 2 by the rivet or bolt which secures the holding element 111 at the carrier rail 106.

The leaf spring 125 has an aperture 30 with a contact face 31. The contact face 31 comes into contact with one of the corresponding engaging faces 122, 122a, 122b of the locking lever 117. Thus, in the engaged condition, supporting the leaf spring on the mowing finger 2 generates counter-clockwise moment on the locking lever 117 and thus a tensile force in the leaf spring. This ensures that even under high forces acting on the locking lever 117 there is no risk of the leaf spring 125 bending.

FIGS. 8 to 10 show a third embodiment of a fixing element 210 according to the invention. Any components in FIGS. 8 to 10 which are comparable with the components of the embodiment according to FIGS. 2 to 4 have been given reference numbers which are increased by the FIG. 200.

Holding element 211 has a substantially U-shaped cross-section. The holding element 211, towards its end facing away from the mowing finger 2, can additionally be closed by a wall. Between the two arms 212, 212a, the locking lever 217 is pivotably supported on a pivot pin 216. The pivot pin 216 passes through an oblong hole 32 provided in the second lever arm 221. The free end of the lever arm 221 includes two teeth with two engaging faces 222, 222a.

The oblong hole ends near the teeth into a planar end face 36. At the other end, the oblong hole 32 changes into a portion which is offset relative to the first portion. This end portion extends along the longitudinal axis and forms an engaging region 33. In its normal condition, the locking lever 217 is in the position as illustrated in FIGS. 8 to 10. The engaging region 33 is on the pivot pin 216. A pressure spring 35 is received in the oblong hole 32. One end of the spring 35 is supported against the end face 36 and other end is supported against the pivot pin 216. Thus, the locking lever 217 is spring loaded towards the above-described position.

In the region of the web 213, the holding element 211 includes a portion angled relative to the general direction of the web 213. The portion forms a stop 34. The portion includes the contact face 31. The face 31 contacts with one of the engaging faces 222, 222a of the second lever arm 221 of the locking lever 217, depending on the pivot position of the locking lever 217.

The first lever arm 218 of the locking lever 217 includes a lug. The lug includes a rounded supporting face 219. The first lever arm 218 supporting face 219 comes to rest on the upper face of the mowing finger 2. Starting from the opened position illustrated in FIG. 8, the locking lever 217 is pivoted clockwise around the pivot pin 216. The first lever arm 218 is acted upon from the outside until it assumes the first engaged position illustrated in FIG. 9. Here, the contact face 31 is in contact with the engaging face 222. The underside of the web 213 is positioned at a distance M1 from establishing contact with the supporting face 219 on the upper face of the mowing finger.

If the locking lever 217 continues to actuate clockwise around the pivot pin 216, the locking lever 217 reaches a position which is shown in FIG. 10. Here, the second lever arm 221 of the locking lever 217, via the engaging face 222a, is supported against the contact face 31 of the stop 34. Thus, the locking lever 217 is non-rotatably held in the opening sense in the counter-clockwise direction around the pivot pin 216. In this position, the distance between the upper face of the mowing finger and the underside of the web 213 is M2. The dimension M2 is smaller than the dimension M1 for the position according to FIG. 9.

Furthermore, the locking lever 217 comprises an aperture 37. The aperture enables introduction of a tool to transfer the locking lever 217 into the released position. After a tool, for example a piece of wire, has been introduced, a pulling effect can be exerted on the locking lever 217. Thus, the locking lever is displaced against the force of the pressure spring 35 in the oblong hole. Accordingly, one of the engaged engaging faces 222 or 222a can be moved out of contact with the contact face 31. The locking lever 217 can then be pivoted counter-clockwise and automatically assume the position as illustrated in FIG. 8.

While the above detailed description describes the preferred embodiment of the present invention, the invention is susceptible to modification, variation and alteration without deviating from the scope and fair meaning of the subjoined claims.

What is claimed is:

1. A grain lifter for combine harvester mowing systems having mowing fingers attached to a finger bar, comprising:
   a carrier rail connectable to the finger bar, a stem lifter connected to the carrier rail, and a fixing element connected to the carrier rail, said fixing element securable to the finger bar, said fixing element including a holding element attached to the carrier rail, said holding element including two spaced arms between which the tip of one mowing finger can be inserted; and holding means for contacting an upper face of the mowing finger, said holding means including a two-arm locking lever with a first lever arm having a supporting face for being supported on the upper face of the mowing finger, and a second lever arm with at least one engaging face, said two-arm locking lever being pivotable around a pivot pin positioned between the two arms and said fixing element including a locking element contacting one of the engaging faces of the second lever arm holding the locking lever in position.

2. A grain lifter according to claim 1, wherein the locking lever includes three engaging faces.

3. A grain lifter according to claim 2, wherein the engaging faces form part of engaging teeth.

4. A grain lifter according to claim 1, wherein the locking element is formed by a leaf spring which resiliently establishes contact in the direction towards the engaging faces of the locking lever.

5. A grain lifter according to claim 4, wherein the end face of the leaf spring comes to rest against one of the engaging faces.

6. A grain lifter according to claim 4, wherein the leaf spring includes an aperture with a contact face and said locking lever, by means of its engaging face, establishes contact with the contact face.

7. A grain lifter according to claim 1, wherein the first and second lever arms adjoin one another at an angle and the pivot axis of the pivot pin is arranged in the region of adjoinment.

8. A grain lifter according to claim 1, wherein during mounting, the second lever arm, by means of the mowing finger, is displaceable into a first engaging position in which one of the engaging faces enters into an operating connection with the locking element.

9. A grain lifter according to claim 1, wherein the locking lever can be moved out of the operating connection with the locking element.

10. A grain lifter according to claim 1, wherein the arms are connected to one another by a web and that the web is connected to the carrier rail.

11. A grain lifter according to claim 1, wherein the arms are connected to one another by two webs and that the latter are connected to the carrier rail.

12. A grain lifter according to claim 2, wherein the leaf spring is arranged between the two arms and within the range of movement of the second lever arm.

13. A grain lifter according to claim 1, wherein in the region of its second lever arm, the locking lever includes an oblong hole which is passed by the pivot pin and that the locking element includes a stop fixed in position.

14. A grain lifter according to claim 13, wherein the locking lever is loaded by a spring force into a position in which the stop is within the range of movement of the second lever arm.

15. A grain lifter according to claim 13, wherein the two arms of the holding element are connected to one another by a web and the stop is connected to the web and the locking lever is arranged between the two arms.

16. A grain lifter according to claim 14, wherein the spring force is provided by a pressure spring and the pressure spring is received in the oblong hole and is supported between an end face of the oblong hole and the pivot pin.

17. A grain lifter according to claim 14, wherein the first lever arm is provided with an aperture.

18. A grain lifter according to claim 13, wherein the oblong hole includes an engaging region for receiving the pivot pin.

19. A grain lifter according to claim 13, wherein the carrier rail is designed so as to be elastically resilient.

* * * * *